March 9, 1965 H. E. BEACH 3,172,190
SHIM ADJUSTMENT MEANS FOR CHIP BREAKERS
Filed April 25, 1963
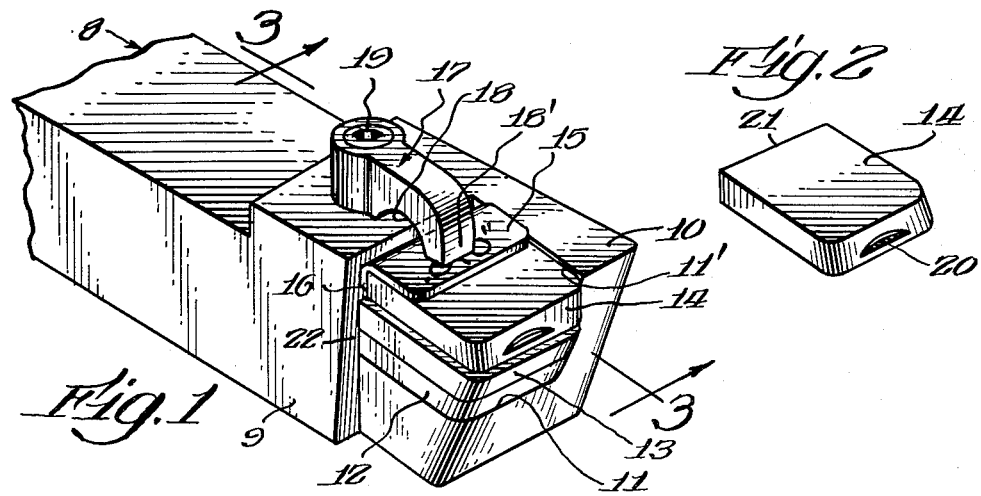
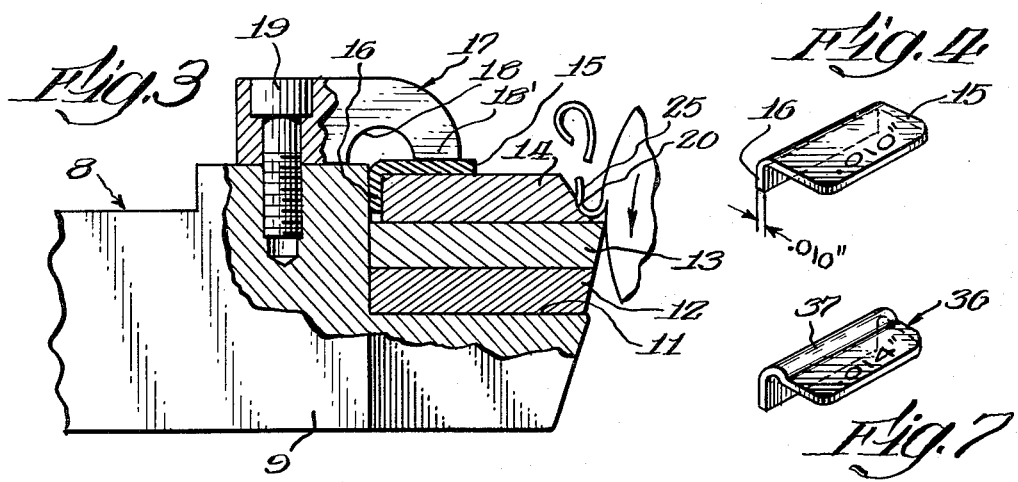
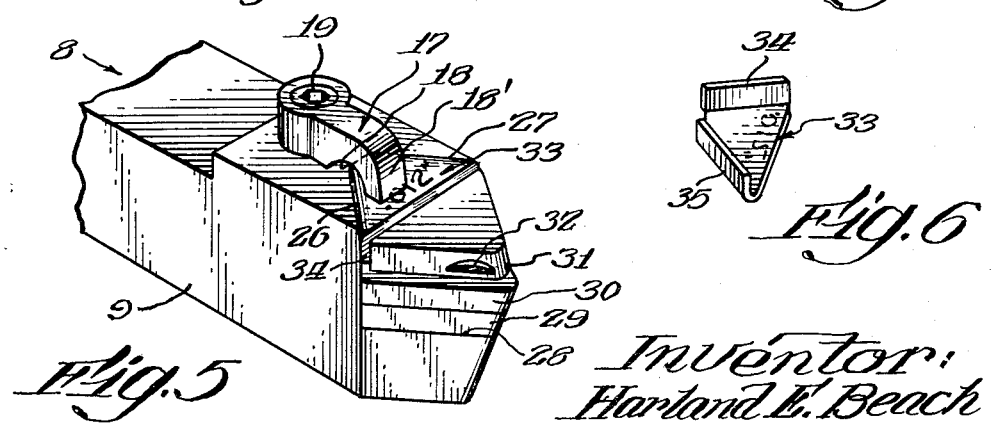
Inventor:
Harland E. Beach
By David Manly Heller
Attorney

United States Patent Office 3,172,190
Patented Mar. 9, 1965

3,172,190
SHIM ADJUSTMENT MEANS FOR CHIP BREAKERS
Harland E. Beach, Rte. 3, Valparaiso, Ind.
Filed Apr. 25, 1963, Ser. No. 275,666
3 Claims. (Cl. 29—96)

My invention relates to improvement in high speed carbide cutting tools used primarily for cutting metals.

An important object of my invention is to provide a carbide metal cutting tool composed of a tool holder, a carbide shim support element, a carbide cutting tool bit, a carbide chip breaker superimposed thereupon, and an adjustment shim element equipped with gaging adjustment means to facilitate adjusting said chip breaker with reference to the cutting edge of said tool bit.

Another object of my invention is to provide adjustment shim elements of varied thicknesses to provide a wide range of chip breaker adjustments, the range being further enhanced by combinations of one or more shim adjustment elements assembled in superimposition.

A further object of my invention is to provide adjustment shim elements of dihedral formation.

A still further object of my invention is to provide adjustment shim elements of dihedral formation in order to furnish a clamping ledge for clamping said adjustment shim elements fixedly so as to militate against chatter and vibrations of a cutting tool assembly and prevent disturbance of the adjusted position as well as displacement of shim elements.

A still further object of my invention is to provide adjustment shim elements having a pair of dihedral angles disposed in angular relationship to accommodate diamond shape cutting tool bits.

To explain briefly the need for my invention, it should be mentioned that in the use of carbide cutting tools, the position of the chip breaker element with reference to the cutting tool bit is of vital importance. Since the cutting operation is performed at high speeds and feeds, metal chips are generated in great abundance and provision for carrying off said chips is necessary equipment associated with metal cutting machine tools. When the chip breaker element is properly located with respect to the cutting edge of the tool bit, the chips are broken into small curls resembling 6's or 9's and are easily carried off leaving clean and clear surroundings for the operator of the machine tool at the same time insuring his safety. When the chip breaker becomes worn, as will appear hereinafter, the chip breaker requires adjustment, otherwise, the chips come off in long continuous coils, which are a source of danger to the operator, and furthermore, tend to foul and clog the carrying off of the chips, thus involving loss of time and interruption of continuous machine operation.

In order to obviate the foregoing difficulties and increase the efficiency of the operation by not impeding continuous operation, my invention has been actually tested to prove its utility.

With the foregoing explanation and objects in mind, the advantages of my invention will be better understood by reference to the accompanying drawings bearing further elucidation in the ensuing description, wherein the various elements are designated by like numerals in the various views, in which:

FIG. 1 is a perspective view of a tool holder assembly embodying a form of my invention.

FIG. 2 is a perspective view of a chip breaker showing a crater worn into its front face.

FIG. 3 is a cross-sectional view taken substantially on line 3—3 of FIG. 1.

FIG. 4 is a perspective view of a preferred form of my invention.

FIG. 5 is a perspective view of a tool holder assembly (as shown in FIG. 1) except that it is constructed with a seat portion to accommodate a diamond shape tool bit and showing a modified form of my invention.

FIG. 6 is a perspective view of another modification of my invention.

FIG. 7 is still another modified form of my invention shown in perspective.

Referring to the various views illustrated, having special reference to FIGS. 1, 2, 3 and 4, it should be noted that the tool holder is generally designated 8 having an extension 9 for assembly to a tool post of a metal cutting machine (not shown) a tip portion 10 provided with a trihedral seat portion consisting of faces 11, 11' and 22. The cutting bit assembly consists of a supporting and protecting shim element 12 to protect the face 11 from breakage or accidental nicking when carbide tool elements break because of extreme hardness of said carbide tool elements, and cutting bit element 13 said chipbreaker element 14 superimposed successively on said element 12. When the chip breaker element 14 is new, element 15 is not employed, and rear edge 21 of element 14 is located up against face 22 the clamp element 17 secures the assembly firmly in place by virtue of hollow head clamp screw 19. The clamp element 17 is provided with a clearance recess 18 and a clamping foot portion 18'.

Referring to FIG. 3 it can be seen how the chips are formed, the chip breaker 14 having its forward edge located with respect to the cutting edge of the tool bit 13 so as to flex the chip initial formation 25 causing it to be bent beyond the tensile strength, or elastic limit, of the chip formation fracturing the same into small curls in the form of 6's or 9's.

After continuous use the chip formation 25 will cause wear on the front surface of the chip breaker 14 resulting in a crater 20. The chip breaker either requires that this crater 20 be ground away or the chip breaker be adjusted with its forward face closer to the cutting edge of the tool bit 13. This is the situation where my invention 15 serves an ideal purpose. As seen in FIG. 4, the shim adjustment element 15 consists of a dihedral element or angular bracket having a top ledge and a downwardly depending flange 16, the thickness of the material from which it is made being of various thicknesses, say from .010" to .020" in increments of .002" so that adjustment shims may be employed progressively to greater thicknesses as the crater 20 wears deeper and they may be used also in combinations of one or more at a time thus increasing the range of adjustment made available. When all adjustments available have been made, then the crater can be ground off and the chip breaker 14 made serviceable once again. Each shim adjustment element 15 for identity is marked as shown indicating the thickness of shim flange 16.

There are different shapes of tool bits employed as for example a diamond shape cutting tool illustrated in FIGS. 5 and 6.

FIG. 5 depicts a tool having a trihedral angle as a pocket to retain on its support ledge 28 and firmly against the dihedral angle 26, 27 the supporting shim 29, the cutting tool bit 30 the chip breaker 31, the worn crater 32, therein, and the adjustment shim element 33 having dependent flanges 34 and 35 and since the thickness of the metal from which the shim is made is .012" the gauging adjustment thus provided by the flanges 34 and 35 is .012" as stamped on the upper face of the adjustment shim element. The adjustment shim elements should preferably be made of a hard spring steel in order that they may withstand wear.

In FIG. 7, I show a slightly modified form 36 of my invention which has a hump portion 37 since it may be found more expedient to produce it as a stamping in which event this construction may lend itself better to stamping production.

It should be understood that my invention is not limited to any specific form, or arrangement of the parts, except in so far as such limitations are specified in the ensuing claims.

It should be noted that the depending flange portion 16 which serves the purpose of providing the increment of shim adjustment is secured to the ledge portion 15 which is clamped firmly in place by the clamp element 17 thus maintaining the gauging adjustment fixed so that it cannot work loose.

Having thus described and disclosed my invention, what I claim as novel and desire to secure by Letters Patent of the United States is as follows:

1. In a carbide cutting tool including a tool holder having a trihedral angular recess provided with a rear upright face and supporting a shim element, a cutting tool bit element, and a chip breaker element provided with a rear edge, shim adjustment means of dihedral formation provided with shim gauging flange means adapted to be interposed between said rear edge of said chip breaker element and the rear upright face of said trihedral angular recess in order to advance the forward edge of said chip breaker element with respect to the cutting edge of said cutting tool bit, said shim adjustment means having a top ledge portion, and clamp means simultaneously and releasably clamping said gauging flange means and said top ledge portion.

2. In a carbide cutting tool including a tool holder having a trihedral angular recess provided with a rear upright face and supporting a shim element, a cutting tool bit element, and a chip breaker element provided with a rear edge, shim adjustment means of dihedral formation provided with shim gauging flange means adapted to be interposed between said rear edge of said chip breaker element and said rear upright face of said trihedral angular recess in order to advance the forward edge of said chip breaker element with respect to the cutting edge of said cutting tool bit, said shim adjustment means having a top ledge portion, and clamp means secured to said tool holder adapted to releasably clamp said shim adjustment means, said chip breaker element, said cutting tool bit element, and said shim element within said trihedral angular recess of said tool holder, simultaneously clamping releasably said gauging flange means and said top ledge portion.

3. In combination, a tool holder having a trihedral angular recess, a cutting tool element and a chip breaker element superimposed thereupon and provided with a rear edge, and shim adjustment means comprising, a dihedral element provided with a top ledge portion, and a downwardly depending flange portion of definite micrometric measurement, said shim adjustment means being superimposed upon said chip breaker element its downwardly depending flange portion contacting said rear edge of said chip breaker element so that when the assembly of both said elements and said shim adjustment means have the rear portions thereof in contact with a vertical surface of said tool holder, the forward edge of said chip breaker element will be adjusted closer to the cutting edge of said cutting tool element.

References Cited by the Examiner
UNITED STATES PATENTS

| | | | |
|---|---|---|---|
| 2,171,694 | 9/39 | Harje | 29—96 |
| 2,296,597 | 9/42 | Carr | 29—96 |
| 2,848,789 | 8/58 | Friedline | 29—96 |
| 2,949,662 | 8/60 | Cook | 29—96 |

FOREIGN PATENTS

| | | |
|---|---|---|
| 88,701 | 3/60 | Denmark. |
| 1,245,148 | 9/60 | France. |
| 848,893 | 9/52 | Germany. |

WILLIAM W. DYER, Jr., *Primary Examiner.*